United States Patent [19]

Manon

[11] Patent Number: 4,549,697
[45] Date of Patent: Oct. 29, 1985

[54] SPREADER GUARD

[75] Inventor: Kenneth P. Manon, Lindenwood, Ill.

[73] Assignee: Swenson Spreader Company, Lindenwood, Ill.

[21] Appl. No.: 502,493

[22] Filed: Jun. 9, 1983

[51] Int. Cl.⁴ .............................................. A01C 17/00
[52] U.S. Cl. ..................................... 239/681; 239/288
[58] Field of Search ............. 239/223, 224, 288–288.5, 239/650, 665, 666, 667, 681, 689

[56] References Cited

U.S. PATENT DOCUMENTS 3,361,364  1/1968  Purtell .............................. 239/288.5

FOREIGN PATENT DOCUMENTS 643803  8/1962  France ................................ 239/689

Primary Examiner—Andres Kashnikow
Assistant Examiner—Scott D. Malpede
Attorney, Agent, or Firm—Trexler, Bushnell & Wolters, Ltd.

[57] ABSTRACT

A guard apparatus is provided for a rotatable, side discharge material distribution spinner having a given circumference and height and a predetermined lateral discharge area. The guard apparatus comprises an upper guard ring and a lower guard ring each defining an outer periphery at least as great as the circumference of the spinner. Coupling brackets are provided for coupling the upper and lower guard rings together in assembled condition in substantially parallel planes and spaced apart by an amount at least as great as the given height of the spinner. A mounting arrangement is provided for mounting the assembled guard rings respectively above and below the spinner so as to respectively overlie the outer circumference thereof while leaving the lateral discharge area thereof unobstructed.

11 Claims, 3 Drawing Figures

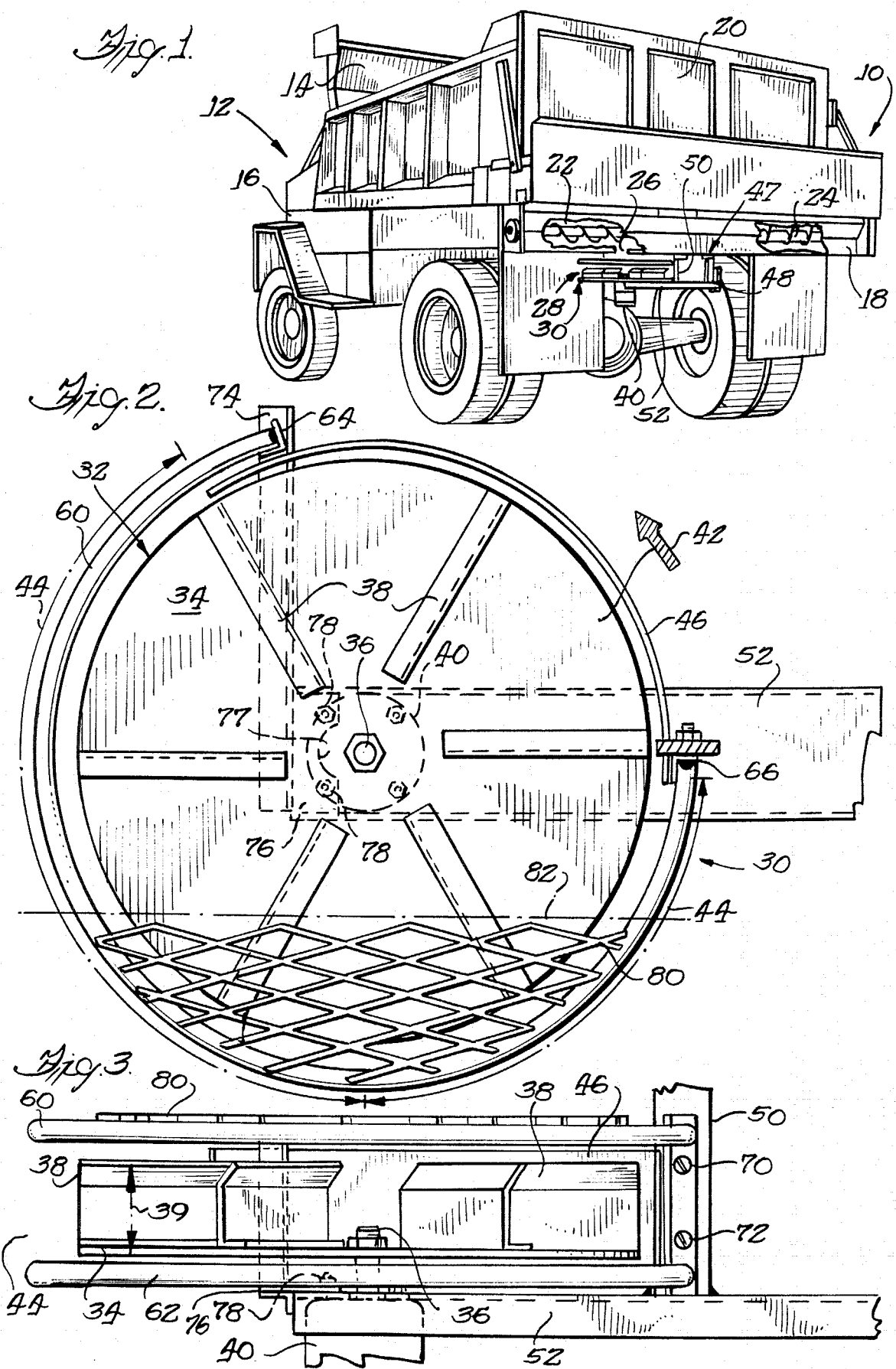

SPREADER GUARD

BACKGROUND OF THE INVENTION

This application is directed generally to the material spreader arts and more particularly to a novel and improved guard structure for a spinner device of the type utilized in a spreader apparatus.

A conventional spinner device or apparatus of the type used in spreader machinery generally includes a substantially flat, circular plate to one side of which are affixed a plurality of generally radially extending fins or blades. This spinner is axially coupled to a suitable motor or other drive apparatus for axial rotation. A material discharge port feeds material in a generally axially downward direction to the spinner, whereupon the radially extending blades discharge the material in a generally lateral direction. An additional baffle plate or the like is frequently utilized to limit the direction of spreading generally to the rear of a vehicle upon which the apparatus is carried, and preferably to either the left or right rear quadrant.

The prior art has proposed various guard arrangments for such a spinner. Such arrangements have often included various guard rings or the like either above or below the spinner. However, it has not heretofore been suggested to provide a unitary guard ring structure which extends both above and below the spinner, but which at the same time leaves the lateral discharge area substantially unobstructed.

OBJECTS AND SUMMARY OF THE INVENTION

Accordingly, it is a general object of the invention to provide a novel and improved guard apparatus for a spinner.

A more particular object is to provide such a guard apparatus which substantially overlies the outer circumference of the spinner both above and below the spinner, while leaving a lateral discharge area thereof substantially unobstructed.

A related object is to provide such a guard apparatus as a unitary construction which is relatively simple and inexpensive in its design and manufacture and yet simple to install and highly reliable in service.

Briefly, and in accordance with the foregoing objects, the present invention provides a guard apparatus for a rotatable, side discharge material distribution spinner having a given circumference and height and a predetermined lateral discharge area. The guard apparatus comprises an upper guard ring and a lower guard ring each defining an outer periphery at least as great as the circumference of the spinner. Coupling means are provided for coupling the upper and lower guard rings together in assembled condition in substantially parallel planes and spaced apart by an amount at least as great as the given height of the spinner. Mounting means are provided for mounting the assembled guard rings respectively above and below the spinner so as to respectively overlie the outer circumference thereof while leaving the lateral discharge area thereof unobstructed.

THE DRAWINGS

The foregoing as well as other objects, features and advantages of the invention will become more readily apparent upon consideration of the following detailed description of the illustrated embodiment, together with reference to the drawings, wherein:

FIG. 1 is a rear perspective view of a typical vehicle-mounted spreader apparatus, in conjunction with which a guard apparatus in accordance with the invention is advantageously utilized;

FIG. 2 is an enlarged view taken generally in the plane of the line 2—2 of FIG. 1; and FIG. 3 is a view taken generally in the plane of the line 3—3 of FIG. 2.

DETAILED DESCRIPTION OF THE ILLUSTRATED EMBODIMENT

Referring now to the drawings, and initially to FIG. 1, a conventional spreader assembly or apparatus is designated generally by the reference numeral 10.

This spreader apparatus 10 is conventionally mounted to the rear of a vehicle 12, and more particularly to the rear end or discharge area of a dump body 14 which is mounted to a conventional truck 16.

In accordance with convention a spreader apparatus 10 includes an elongate trough 18 arranged to receive material through a tailgate 20 of the dump body 14. Within this trough 18, a pair of augers 22, 24 are arranged to carry the material in the direction of a bottom discharge opening 26. Immediately below this opening is located a conventional spinner apparatus designated generally by the reference numeral 28.

Departing from convention, a guard assembly 30, in accordance with the invention is provided for the spinner apparatus 28.

Referring now also to FIGS. 2 and 3, the guard assembly 30 is shown in additional detail. Advantageously, the guard assembly 30 is provided as a unitary, one-piece construction, which can be quickly and easily assembled to the spreader apparatus. In this regard, the guard assembly 30 is advantageously configured to extend about the outer periphery of both top and bottom portions of the spinner 28, while leaving a side or lateral discharge area thereof substantially unobstructed.

Referring now more particularly to the drawings, the spinner assembly 28 will be seen to comprise a spinner member 32 which generally comprises a flat circular base plate 34 which has an axis or center 36. The base plate 34 carries a plurality of generally radially extending fins or blades 38 of a given height 39. The plate 34 is mounted for axial rotation at its center or axis 36 to a suitable drive such as a motor 40. Generally speaking, the foregoing structure of base plate 34 and blades 38 are configured to discharge material generally in a side or laterally outward direction as the spinner 32 rotates in the direction generally indicated by the arrow 42. Hence, material received from the auger-trough discharge opening 26 immediately above the spinner 32 is spread laterally outwardly through this lateral discharge area, which is indicated generally by reference numeral 44. In this regard, a suitable arcuate baffle plate 46 is also provided to generally limit the lateral discharge to an area generally to one side of and behind the vehicle 12. Hence, the discharge area 44 is defined essentially by the height 39 of the blades 38, together with the circumference of the plate 34 and the arcuate extent of the baffle plate 46.

In the illustrated embodiment, the foregoing spinner structure is mounted to the remaining part of the spreader structure 10 by a pivot or hinge assembly designated generally 46. However, other mountings may be effected, without departing from the invention. This pivotal mounting arrangement 47 supports a pair of generally vertically downwardly depending struts or support members 48, 50. These struts 48, 50 in turn support a lateral or generally horizontally extending bar or support channel 52. This latter support channel 52 carries the motor 40 and spinner 32 at its end opposite the vertical depending support arms 48 and 52.

In accordance with a feature of the invention, the guard ring assembly 30 of the invention is arranged to couple with these existing support members 50 and 52 while leaving the lateral discharge area 44 substantially unobstructed. In this regard, the guard structure includes substantially identically configured top and bottom guard rings 60 and 62. Each of the top and bottom guard rings 60 and 62 preferably comprises a substantially tubular, semi-annular member, and hence substantially semi-toroidal in configuration. Each of these rings 60 and 62, as best viewed in FIG. 2, subtends somewhat less than 270 degrees of arc.

Advantageously, the semi-annular, tubular construction of these upper and lower or top and bottom guard rings 60, 62 is believed to greatly enhance the structural strength and rigidity thereof.

In accordance with a further feature of the invention, these upper and lower guard rings are coupled together at respective upper and lower ends of a pair of substantially identical coupling brackets 64 and 66. In the illustrated embodiment, these brackets 64 and 66 are substantially identical and comprise generally L-channel-type brackets. Preferably, the respective ends of top and bottom guard rings 60 and 62 are fixed to these brackets 64 and 66 by suitable means as by welding.

Advantageously, as best seen in FIGS. 2 and 3, the outer peripheries or circumferences of the respective upper and lower guard rings 60 and 62 may thus readily be positioned to overlie the outer periphery of the spinner 32, as defined by the outer periphery or edge of the base plate 34 thereof. Additionally, as best viewed in FIG. 3, the guard rings 60 and 62 are additionally vertically spaced by the respective brackets 64 and 66 so as to be spaced apart by a dimension somewhat greater than the height of the spinner 32. This height is defined primarily by the height 39 of the blades 38, the plate 34 being relatively thin. It will be noted that the assembled brackets and guard rings thus far described are oriented in FIGS. 2 and 3 with respect to the spinner and baffle 46 such that the entire lateral discharge area 44 is left free of any obstruction.

In this regard, the bracket 66 is advantageously oriented so as to be locatable substantially flat against the surface of the vertical support member 50, whereby it may be affixed thereto by suitable means such as by fasteners 70, 72. On the other hand, the second bracket 64 is preferably coupled as by welding at its lower end to a further, similar L-shaped channel member or bracket 74. This second or mounting channel or bracket 74 extends generally inwardly toward the area about the axis 36 of the spinner 32. At its opposite end, this bracket 74 mounts a substantially flat mounting plate 76 which is provided with suitable through apertures for accepting fasteners 78 therethrough. These fasteners 78 are preferably the same fasteners utilized to affix the motor 40 to the horizontal support brackets or channel 52 previously described. Hence, the orientation of bracket 74 and plate 76 is such as to locate the mounting plate 76 for receiving these fasteners 78 in this fashion. In this regard, the plate 76 preferably includes an arcuate cut-out portion 77, so as not to interfere with motor 40.

In accordance with a preferred embodiment of the invention, a screen member 80 is also provided affixed to the upper guard ring 60. As indicated by the phantom line 82 in FIG. 2, the auger-trough 18 normally extends over a major fractional portion of the top area of the spinner 32. However, a minor fractional portion of the spinner does extend outwardly beyond the auger-trough 18. Accordingly, the screen member 80 advantageously prevents access to this portion of the spinner 32 from an area thereabove. In this regard, the screen 80 preferably comprises an expanded metal grid or mesh member and is affixed to a top or upper peripheral surface of the upper guard ring 60 by suitable means as by welding. Hence, access to the spinner 32 from above is limited to the discharge area 26 of the auger-trough 18, as previously described, for receiving the material to be spread.

What has been illustrated and described herein is a novel guard structure for a spinner of the type generally utilized in a mobile material spreading machine. While the invention has been illustrated and described with reference to a preferred embodiment, the invention is not limited thereto. Those skilled in the art may devise various changes, alternatives and modifications. The invention includes such changes, alternatives and modifications insofar as they fall within the spirit and scope of the appended claims.

The invention is claimed as follows:

1. A guard apparatus for rotatable, lateral discharge, solid material distribution spinner having an axis and a given circumference and given height defining a lateral discharge area, said guard apparatus comprising: an upper ground ring and a lower guard ring each defining an outer periphery at least as great as the circumference of said spinner; coupling means for coupling the upper and lower guard rings together in assembled condition and in parallel planes, spaced apart by an amount at least as great as said given height of said spinner; and mounting means for mounting the assembled guard rings and coupling means with said coupling means in a predetermined alignment and with the guard rings oriented in planes respectively above and below the spinner so as to respectively overlie the outer circumference thereof while leaving the lateral discharge area thereof unobstructed; said coupling means comprising substantially identical first and second brackets, each of a length greater than the height of said spinner, said brackets being alignable by said mounting means in said predetermined alignment comprising an alignment wherein respective ends thereof extend at least beyond upper and lower axial extremities of said spinner, and means for affixing respective ends of said upper and lower guard rings to respective upper and lower parts of the first and second brackets; and said mounting means comprising fastener receiving means in one of said first and second brackets alignable with a plane substantially parallel to said spinner axis and beyond the outer periphery of the spinner, and an elongate third mounting bracket affixed to a lower end of the other of said first and second brackets and in a plane substantially parallel with an undersurface of said spinner.

2. A guard apparatus according to claim 1 and further including screen means coupled to said upper guard ring for limiting access to said spinner from above to a predetermined material ingress area normally substantially covered by a material handling trough, for permitting delivery of material to the spinner to be distributed thereby.

3. A guard apparatus according to claim 1 wherein said upper and lower guard rings comprise a pair of substantially identical semi-annular rings.

4. A guard apparatus according to claim 1 wherein said means for affixing comprises a plurality of weldments respectively joining the upper and lower rings with the first and second brackets.

5. A guard apparatus according to claim 1 wherein said first and second brackets comprise angle channels.

6. A guard apparatus according to claim 1 wherein said third mounting bracket comprises an elongate member having one end coupled with a lower edge part of one of said first and second brackets adjacent the coupling thereof with the lower guard ring, and extending inwardly therefrom toward an area adjacent the axis of said spinner, and a second end spaced below said spinner in a plane substantially parallel with a lower surface thereof.

7. A guard apparatus according to claim 2 wherein said guard rings comprise tubular, semi-toroidal members, subtending on the order of 270 degrees of arc.

8. A guard apparatus according to claim 2 wherein said screen means comprises an expanded metal member coupled to an upper peripheral portion of said upper guard ring.

9. A guard apparatus according to claim 6 wherein said mounting bracket further includes a substantially flat mounting plate coupled thereto at said second end thereof and carrying fastener receiving means.

10. A guard apparatus for a rotatable, lateral discharge, solid material distribution spinner having a given circumference and height defining in part a lateral discharge area, said guard apparatus comprising: a tubular upper guard ring and a tubular lower guard ring each defining an outer periphery at least as great as the circumference of said spinner; coupling means for coupling the upper and lower guard rings together in parallel planes, spaced apart by an amount at least as great as said given height of said spinner; mounting means for mounting the coupling means so as to hold the guard rings respectively above and below the spinner so as to respectively overlie the outer circumference thereof while leaving the lateral discharge area thereof unobstructed; and screen means coupled to said upper guard ring for limiting access to said spinner from above to a predetermined material ingress area normally substantially covered by a material handling trough.

11. A guard apparatus according to claim 10, wherein said upper and lower guard rings, said screen means, said coupling means and said mounting means are welded together to define a unitary construction.

* * * * *